(12) United States Patent
Hong et al.

(10) Patent No.: US 8,774,879 B2
(45) Date of Patent: Jul. 8, 2014

(54) MOBILE TERMINAL

(75) Inventors: Sung-Chul Hong, Seoul (KR); Soon-Sung Kwon, Anyang (KR)

(73) Assignee: LG Electronics Inc., Seoul (KR)

( * ) Notice: Subject to any disclaimer, the term of this patent is extended or adjusted under 35 U.S.C. 154(b) by 414 days.

(21) Appl. No.: 12/535,421

(22) Filed: Aug. 4, 2009

(65) Prior Publication Data

US 2010/0124956 A1    May 20, 2010

(30) Foreign Application Priority Data

Nov. 14, 2008 (KR) .................. 10-2008-0113672

(51) Int. Cl.
*H04M 1/00* (2006.01)

(52) U.S. Cl.
USPC ... 455/575.4; 345/173; 455/566; 379/428.01; 379/428.03

(58) Field of Classification Search
USPC ............ 455/550.1, 556.2, 566, 575.1, 575.3, 455/575.4; 345/173; 379/428.01, 428.03, 379/428.04, 433.01, 433.04, 433.06, 379/433.12, 437
See application file for complete search history.

(56) References Cited

U.S. PATENT DOCUMENTS

| 6,332,024 | B1 * | 12/2001 | Inoue et al. | 379/433.06 |
|---|---|---|---|---|
| 6,664,951 | B1 * | 12/2003 | Fujii et al. | 345/173 |
| 7,072,624 | B2 * | 7/2006 | Zheng et al. | 455/90.3 |
| 7,116,780 | B2 * | 10/2006 | Sun | 379/433.01 |
| 7,831,286 | B2 * | 11/2010 | Cho et al. | 455/575.4 |
| 7,839,391 | B2 * | 11/2010 | Varian et al. | 345/173 |
| 7,884,808 | B2 * | 2/2011 | Joo | 345/173 |
| 2006/0252471 | A1 * | 11/2006 | Pan | 455/575.4 |
| 2007/0281675 | A1 * | 12/2007 | Pletikosa et al. | 455/418 |
| 2008/0004083 | A1 * | 1/2008 | Ohki et al. | 455/566 |
| 2008/0051161 | A1 * | 2/2008 | Tashiro | 455/575.1 |
| 2009/0075702 | A1 * | 3/2009 | Kubodera et al. | 455/566 |
| 2009/0115738 | A1 * | 5/2009 | Chueh | 345/173 |
| 2009/0135555 | A1 * | 5/2009 | Komine et al. | 361/679.26 |
| 2010/0071155 | A1 * | 3/2010 | Ueyama et al. | 16/250 |

FOREIGN PATENT DOCUMENTS

| CN | 101042611 A | 9/2007 |
|---|---|---|
| JP | 2000-200141 A | 7/2000 |

* cited by examiner

*Primary Examiner* — Michael Faragalla
*Assistant Examiner* — Gerald Oliver
(74) *Attorney, Agent, or Firm* — Birch, Stewart, Kolasch & Birch, LLP

(57) ABSTRACT

A mobile terminal having a terminal body, a window attached to the terminal body, the window having first and second regions, a display module disposed at a rear side of the first region, the display module being configured to display visible information through the first region, at least one switch disposed at a rear side of the second region, the at least one switch being configured to allow inputting of information when at least part of the second region is pressed inward, and a hook member disposed at a portion of the second region, the hook member being configured to restrict upward movement of the second region, is provided.

11 Claims, 5 Drawing Sheets

MOBILE TERMINAL

CROSS-REFERENCE TO RELATED APPLICATIONS

This application claims priority to Korean Application No. 10-2008-0113672, filed on Nov. 14, 2008, the contents of which is incorporated by reference herein in its entirety.

BACKGROUND OF THE INVENTION

1. Field of the Invention

The present invention relates generally to a mobile terminal. More particularly, the present invention relates to a mobile terminal with a window allowing an input of information in a pressing manner.

2. Description of Related Art

Mobile terminals can be easily carried and have one or more of functions such as supporting voice and video telephony calls, inputting and/or outputting information, storing data, and the like. As they have become multifunctional, the mobile terminals can capture still images or moving images, play music or video files, play games, receive broadcast, and the like, so as to be implemented as an integrated multimedia player.

Various new attempts have been made for implementing these mobile terminals as multimedia devices using hardware or software to provide these complicated functions. For example, a user interface environment is provided in order for users to easily and conveniently retrieve or select functions.

Also, many users select their mobile terminals as expressions of their own personalities, and accordingly, various designs are required for the mobile terminal. Recently, the focus has been on allowing a user to input information more conveniently while obtaining a simple appearance of the mobile terminal.

BRIEF SUMMARY OF THE INVENTION

Therefore, one aspect of the present invention is to implement a configuration capable of inputting information by pressing a window itself, thereby improving the sense of manipulation in addition to obtaining a simple appearance of a mobile terminal.

Another object of the present invention is to provide a configuration of preventing a window from coming free of the mobile terminal, due to a relative motion between the window and the terminal body.

To achieve these and other advantages and in accordance with the purpose of the present invention, as embodied and broadly described herein, there is provided a mobile terminal having a terminal body, a window attached to the terminal body, the window having first and second regions, a display module disposed at a rear side of the first region, the display module being configured to display visible information through the first region, at least one switch disposed at a rear side of the second region, the at least one switch being configured to allow inputting of information when at least part of the second region is pressed inward, and a hook member disposed at a portion of the second region, the hook member being configured to restrict upward movement of the second region.

In accordance with another aspect of the present invention, there is provide a mobile terminal having a window including first and second regions, a terminal body configured to support the first region such that the second region is deflectable upon being pressed, at least one switch disposed in the terminal body, the at least one switch being configured to allow inputting of information when at least part of the second region is deflected inward, and a hook member disposed at a portion of the second region, the hook member being configured to restrict upward movement of the second region.

The foregoing and other objects, features, aspects and advantages of the present invention will become more apparent from the following detailed description of the present invention when taken in conjunction with the accompanying drawings. However, it should be understood that the detailed description and specific examples, while indicating an exemplary embodiment of the invention, is given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Description will now be given in detail an exemplary embodiment of a mobile terminal according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noted that "module" and "unit or portion" are used interchangeably.

Figure 1:
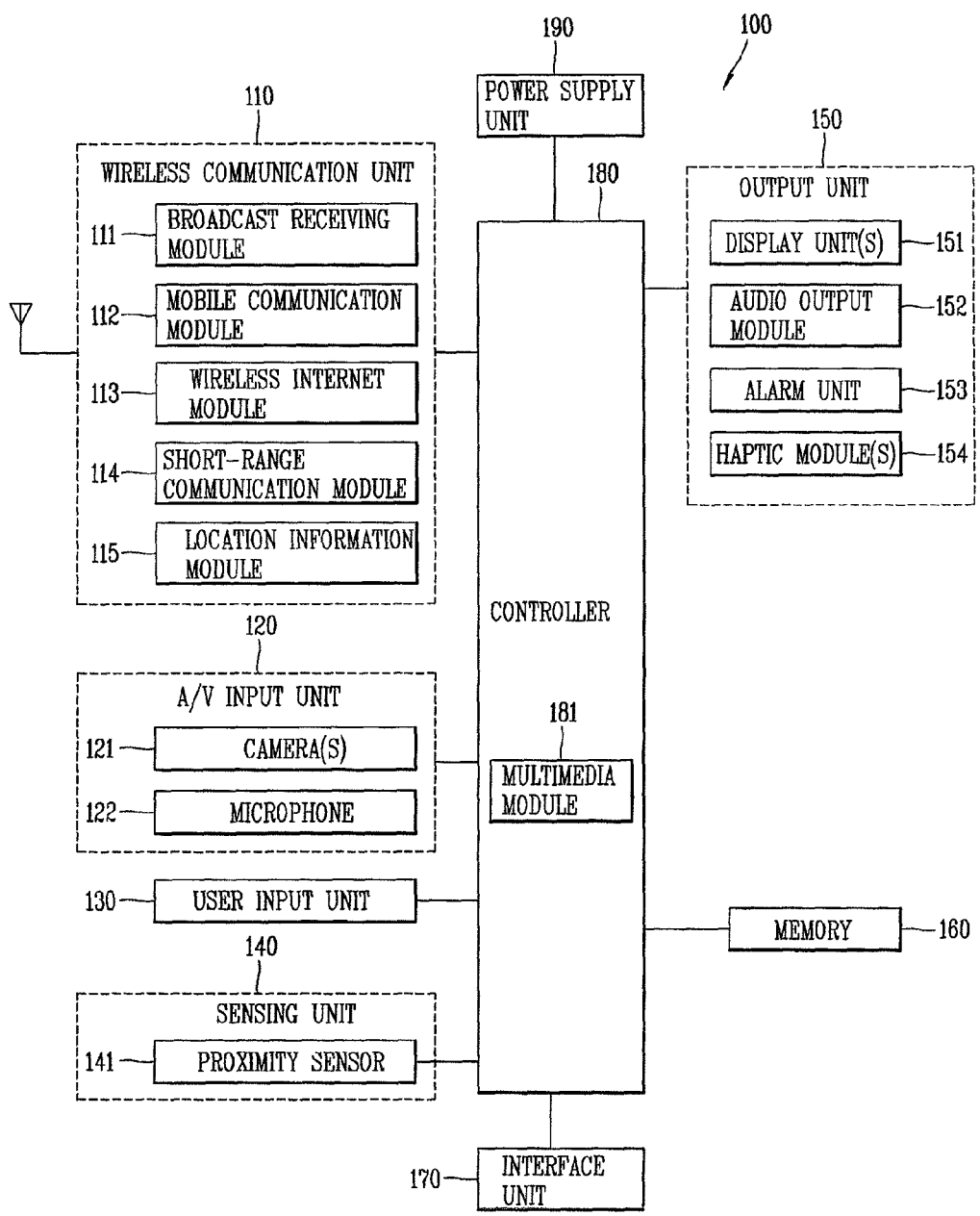
FIG. 1 is a block diagram of a mobile terminal in accordance with an exemplary embodiment of the present invention.

Referring to FIG. 1, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

The wireless communication unit 110 may typically include one or more modules that permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server that generates and transmits a broadcast signal and/or broadcast associated information or a server that receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of various network entities (e.g., base station, an external portable terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency Identification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch, and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device. The sensing unit 140 may include a proximity sensor 141.

The output unit 150 is configured to output an audio signal, a video signal, or a tactile signal. The output unit 150 may include a display unit 151, an audio output module 152, an alarm unit 153, a haptic module 154, and the like.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display a captured and/or received image, a UI, or a GUI. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the touch sensors sense touch inputs, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and the like. The audio output module 152 may output audio signals relating to functions performed in the mobile terminal 100, e.g., sound indicating a call received or a message received, and the like. The audio output module 152 may include a receiver, a speaker, a buzzer, and the like.

The alarm unit 153 outputs signals notifying occurrence of events from the mobile terminal 100. The events occurring from the mobile terminal 100 may include call received, message received, key signal input, touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized as a part of the alarm unit 153.

The haptic module 154 generates various tactile effects that a user can feel. A representative example of the tactile effects generated by the haptic module 154 includes vibration. Vibration generated by the haptic module 154 may have a controllable intensity, a controllable pattern, and the like. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, videos, and the like). Also, the memory 160 may store data related to various patterns of vibrations and audio output upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage that performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

For coupling devices having an identification module, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181, which provides multimedia playback. The multimedia module 181 may be configured as part of the controller 180 or as a separate component. In addition, the controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, the controller 180 may implement the embodiments.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
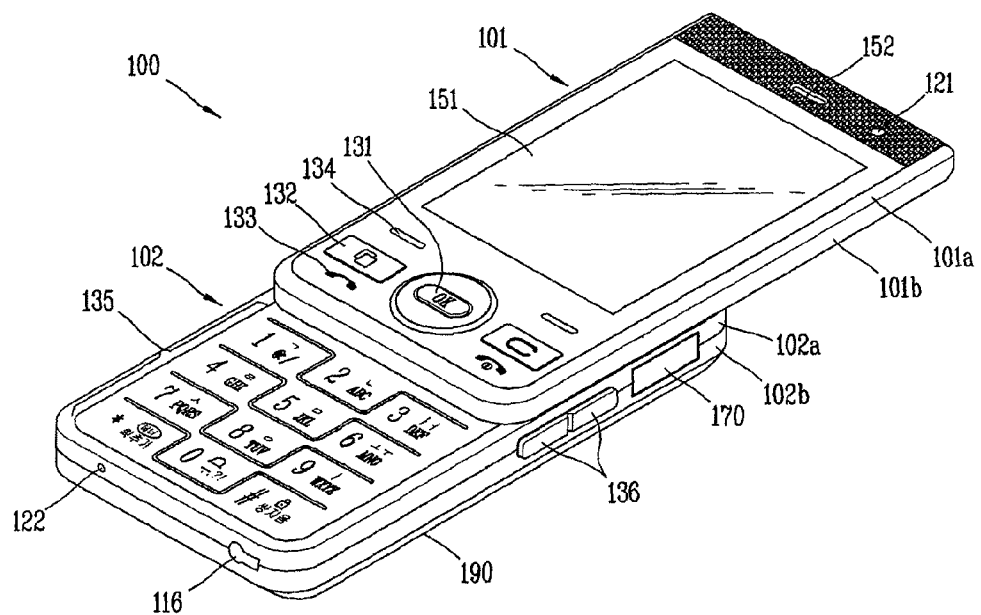
FIG. 2 shows a perspective view showing a front side of a mobile terminal in accordance with the exemplary embodiment of the present invention.

Referring to FIG. 2, the mobile terminal 100 is a slide type mobile terminal having two bodies 101 and 102 coupled to each other to be relatively movable. However, the present invention is not limited to this type of mobile terminal, rather the present invention is applicable to various configurations, such as a bar type, a folder type, a swing type, a swivel type, and the like.

The mobile terminal 100 according to this exemplary embodiment may include a first body 101, and a second body 102 that is slidable with respect to the first body 101 in at least one direction. As shown in FIG. 2, the first body 101 exposes at least part of the second body 102 when the mobile terminal 100 is in an open position (open state or open configuration). When the first body 101 is fully positioned over the second body 102, the mobile terminal 100 is in a closed position (closed state or closed configuration).

The mobile terminal may typically operate in a standby mode in the closed configuration but such standby mode may be released according to a user's manipulation. Also, the mobile terminal may typically operate in a call-communication mode in the open configuration but such mode may be converted into the standby mode according to the user's manipulation or after a certain time duration.

A case (casing, housing, cover, etc.) forming an outer appearance of the first body 101 may be formed from a front case 101a and a rear case 101b. A space formed by the front case 101a and the rear case 101b may accommodate various components therein. At least one intermediate case may further be disposed between the front case 101a and the rear case 101b. These cases may be formed by injection-molded synthetic resin, or may be formed using a metallic material such as stainless steel (STS) or titanium (Ti).

The first body 101, particular the front case 101a, includes a display unit 151, a first audio output module 152, a first camera 121, a user input unit 130 (e.g., 131 to 134), and the like. The user input unit 130 may be manipulated to allow inputting of commands for controlling operations of the mobile terminal 100, and includes a plurality of first manipulation units 131 to 134, which will be described in greater detail below.

Similar to the first body 101, the case of the second body 102 may be formed from a front case 102a and a rear case 102b. A second manipulation unit 135 may be disposed at the second body 102, particularly, at a front face of the front case 102a. At least one of the front case 102a or the rear case 102b may be provided with a third manipulation unit 136 and a microphone 122.

The first to third manipulation units 131 to 136 may be referred to as a manipulating portion. Such manipulating portion can employ any tactile manner that a user can touch or tap for manipulation. For instance, the manipulation portion may be implemented as a dome switch, a touch screen, a touch pad, or the like by which a user can input commands or information in a pushing or touching manner. Alternatively, the manipulating portion may be implemented as a jog wheel or a jog switch that rotates, keys, or a joystick.

Figure 4:
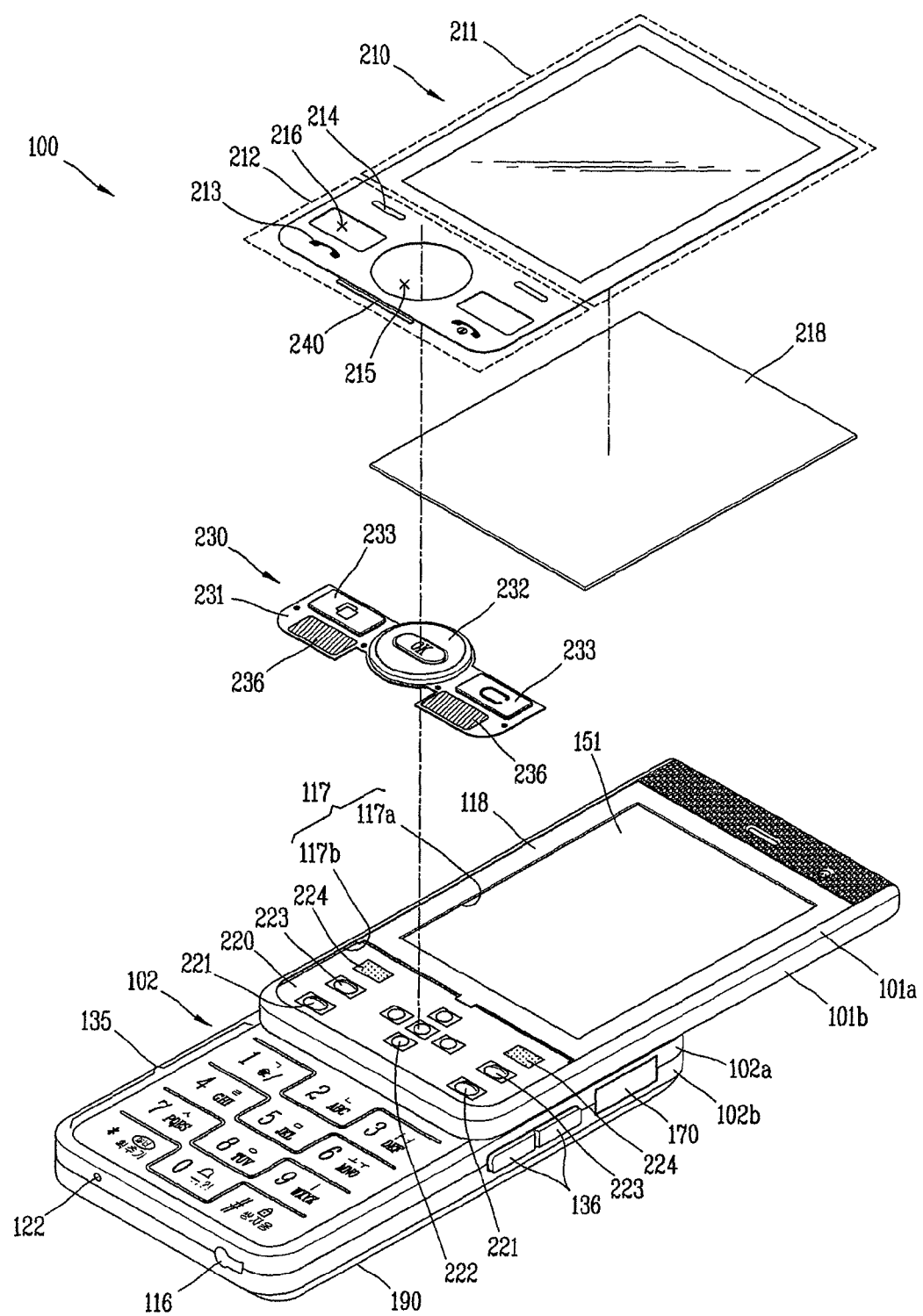
FIG. 4 shows a disassembled view of the mobile terminal of FIG. 2.

The first manipulation units 131 to 134 according to this exemplary embodiment may include first and second push keys 131 and 132 operated by being pressed, and a push key 133 and a touch key 134 both integrally formed on a window 210 (see FIG. 4). The second and third manipulation units 135 and 136 may be configured as a type of dome switch.

From the functional perspective the first manipulation units 131 to 134 are configured to input commands such as START, END, SCROLL, or the like, and the second manipulation unit 135 is configured to input numbers, letters (characters), symbols, or the like. Also, the third manipulation unit 136 can function as a hot key, which performs a specific function, such as activating a first camera 121, and the like.

Figure 3:
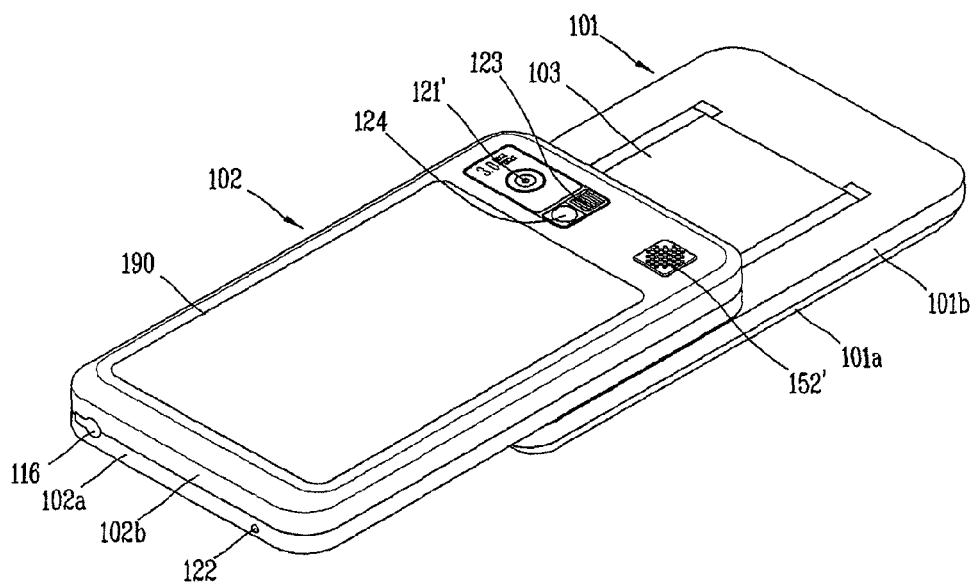
FIG. 3 shows a perspective view of a rear side of the mobile terminal of FIG. 2.

As shown in FIG. 3, a rear face of the rear case 102b of the second body 102 may further be provided with a second camera 121'. The second camera 121' faces a direction which is opposite to a direction faced by the first camera 121, and may have different pixels from those of the first camera 121. For example, the first camera 121 may operate with relatively lower pixels (lower resolution). Thus, the first camera 121 may be useful when a user can capture his face and send it to another party during a video call or the like. On the other hand, the second camera 121' may operate with a relatively higher pixels (higher resolution) such that it can be useful for a user to obtain higher quality pictures for later use.

A flash 123 and a mirror 124 may additionally be disposed adjacent to the second camera 121'. The flash 123 operates in conjunction with the second camera 121' when taking a picture using the second camera 121'. The mirror 124 can cooperate with the second camera 121' to allow a user to photograph himself in a self-portrait mode.

A second audio output module 152' may further be disposed at a rear case 102b. The second audio output module 152' can cooperate with the first audio output module 152 (see FIG. 2) to provide stereo output. Also, the audio output module 152' may be configured to operate as a speakerphone.

A broadcast-signal receiving antenna 116 may further be disposed at one side of the rear case 102b in addition to an antenna for communications. The broadcast-signal receiving antenna 116 may be a part of the broadcast receiving module 111 (see FIG. 1) and may be retractable into the second body 102.

A power supply unit 190 for supplying power to the mobile terminal 100 may be mounted in the rear case 102b. If the power supply unit 190 is a rechargeable battery, the power supply 190 may be detachably coupled for charging.

A part of a slide module 103 for slidably coupling the first body 101 to the second body 102 may be disposed at the rear case 101b of the first body 101. Another part of the slide module 103 may be disposed at the front case 102a of the second body 102, so as not to be exposed to the exterior as shown in FIG. 2.

While various components have been described as being disposed at the second body 102; the present invention is not so limited. It is also possible that one or more of those components that have been described to be located at the rear case 102b, such as the second camera 121', can be implemented on the first body 101, particularly, on the rear case 101b. In this configuration, the second body 102 can protect the component(s) disposed on the rear case 101b when the mobile terminal is in a closed state. In addition, the first camera 121 can be implemented to be rotatable so as to provide the same function as the second camera 121', thereby eliminating the need for the second camera 121'.

As shown in FIG. 4, a window 210 is disposed on a front surface of the front case 101a of the first body 101. The window 210 may be made of a transparent material such that information output on a display module 151 is viewable. The window 210 may be formed of an elastically deflectable synthetic resin, for example, polymethyl metha acrylate (PMMA), polycarbonate (PC) or the like. The window 210 preferably has a thickness (e.g., 0.5 mm to 0.9 mm) that is thin enough to be deflectable upon being pressed.

A principal surface of the window 210 may be divided into a first region 211 and a second region 212. A portion of the first region 211, occupied by an output region of the display module 151 may be transparently formed. Further, the entire window 210, excluding the output region of the display module 151, may be non-transparently formed, so as to shield other components disposed in the first body 101.

When the mobile terminal 100 has a touch screen function, a touch sheet (not shown) for detecting a touch input may further be disposed in the first region 211.

A window-mounting portion 117 in which the window 210 is aligned may be formed at the front case 101a. The window-mounting portion 117 may have a supporting surface 118 for supporting and fixing the first region 211 of the window 210. The supporting surface 118 may be formed to define the output region of the display module 151. The window 210 may be attached onto the supporting surface 118 by means of an adhesive or an adhesive film.

At an inner side of the window-mounting portion 117, a first through hole 117a by the supporting surface 118 is provided. A second through hole 117b formed to correspondence with the second region 212 of the window 210 is also provided at the inner side of the window-mounting portion 117. The display module 151 is located in the first through hole 117a, and a printed circuit board 220 is disposed inside the second through hole 117b. With this configuration, the display module 151 and the printed circuit board 220 may be placed at rear sides of the first region 211 and the second region 212, respectively.

The printed circuit board 220 may be provided with switches 221, 222, and 223, touch sensors 224, light emitting diodes for illuminating the window 210 or key buttons 232 and 233, and the like.

A keypad 230 is mounted onto a front side of the printed circuit board 220. The keypad 230 may be configured to have a plurality of key buttons 232 and 233 being mounted on a key sheet 231. In this embodiment, the key buttons 232 and 233 may include a first key button 232 disposed at a central portion of the key sheet 231, and second key buttons 233 disposed at both sides of the first key button 232. Transparent color portions 236 may be formed on the key sheet 231 so that light from the light emitting diodes can have specific colors. The transparent color portions 236 may be transparently formed to allow light from the light emitting diodes to be transmitted therethrough. Also, the transparent color portions 236 may be formed to have specific colors. Here, the transparent color portions 236 may be configured to have the same color or different colors.

Push protrusions (e.g., see 234 and 235 of FIG. 7), which press the switches 221, 222, and 223 in cooperation with the window 210 being pressed or the key buttons 232 or 233 being pressed, may be formed at a rear surface of the key sheet 231.

Figure 5:
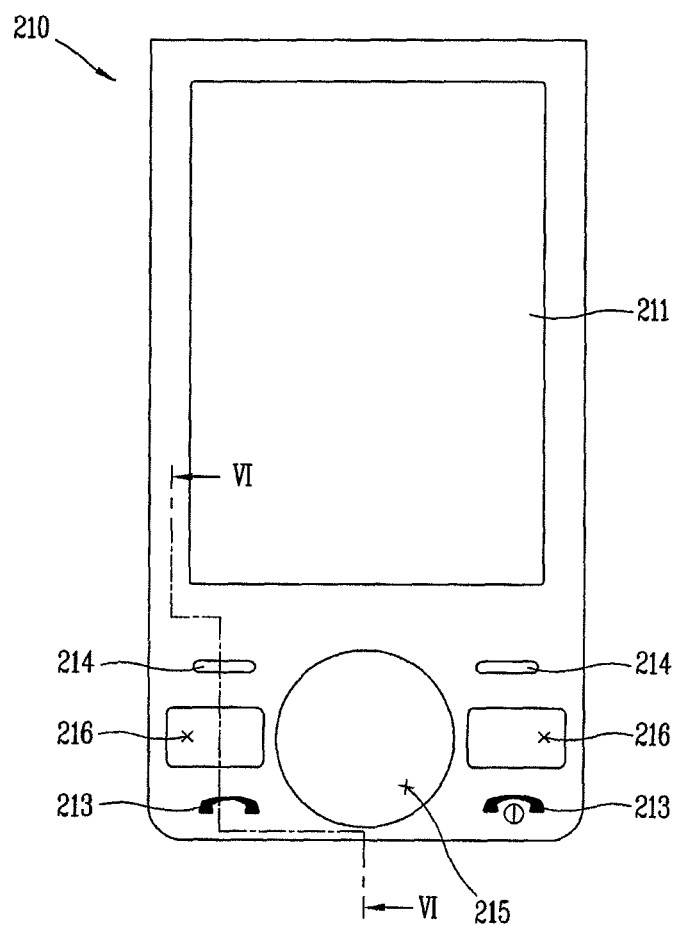
FIG. 5 shows a plane view of a window shown in FIG. 4.

Referring to FIG. 5, the second region 212 of the window 211 may include push regions 213 and touch regions 214. The first switches 221 may be disposed at the rear side of the push regions 213. When at least one of the push regions 213 is pressed, the corresponding first switch 221 is deflected, thereby information being input. Touch sensors 224 may be disposed at a rear side of the touch regions 214. When one of the touch regions 214 is touched, the corresponding touch sensor 224 detects the touch input.

Marks, characters, symbols, or numbers that represent input values may be indicated on the push regions 213 and the touch regions 214 so as to distinguish such regions from their peripheral regions. The marks or the like may be formed by being printed or carved on one surface of the window 210. Further, the marks or the like may be transparently formed such that light from the light emitting diodes can be transmitted therethrough, and also be formed to have specific colors.

Keyholes 215 and 216 in which the key buttons 232 and 233 are aligned may be formed at the second region 212. The keyholes 215 and 216 may include a first keyhole 215 formed at the central portion of the second region 212 and second keyholes 216 formed at both sides of the first keyhole 215.

One of the push region 213 and the touch region 214 may be formed at one side of the corresponding second keyhole 216, and another one may be formed at another side thereof. The first key button 232 and the second key buttons 233 may be disposed in the first keyhole 215 and the second keyholes 216, respectively. The second switches 222 and the third switches 223 may be disposed at the rear surfaces of the first key button 232 and the second key buttons 233, respectively. Here, the second switches 222 may be arranged on plural places at the rear side of the first key button 232.

Alternatively, push regions may be formed to replace portions where the touch regions 214 are formed. That is, the push regions may be disposed at both sides of each second keyhole 216.

This exemplary embodiment is configured such that the push regions 213 are formed below the second keyholes 216, and the touch regions 214 are formed above the second keyholes 216. Accordingly, upon the push regions 214 being pressed (pushed), the corresponding regions can be more easily transformed.

The first and second keyholes 215 and 216 may function as arrangement spaces for the key buttons 232 and 233 and also function to increase the level of deflection of a push region 214 with respect to a particular force applied to the corresponding push region 214. In other words, removing portions of the window 210 increases the flexibility of window 210.

Figure 6:
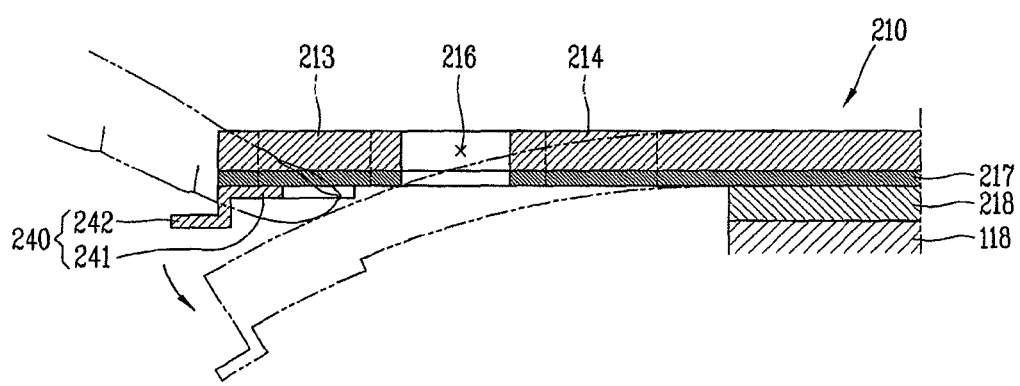
FIG. 6 shows a cross-sectional view of the window taken along the line VI-VI of FIG. 5.

Referring to FIG. 6, a printed layer 217 is disposed at a rear surface of the window 210. The printed layer 217 may be non-transparently formed so as to define the output region of the display module 151. Also, the printed layer 217 may be configured such that a specific mark or at least one of symbol, character or number can be indicated on the push regions 213 and the touch regions 214. Further, the printed layer 217 may be formed to have a specific color.

A supporting plate 218 for increasing the rigidity to the window 210, particularly, at the first region 211 may be attached onto the rear surface of the printed layer 217. The supporting plate 218 may be formed of a transparent material, and may have an area corresponding to the first region 211. The supporting plate 218 may be attached onto the first region 211 of the window 210 by use of an adhesive or an adhesive film. When the first region 211 of the window 210 is pressed or impacted, the supporting plate 218 may prevent the deformation of the first region 211, for example, preventing the first region 211 from getting curved or twisted (torsional) backwardly. The supporting plate 218 preferably is very thin thickness to be curved more flexibly than does the window 210.

The dotted line of FIG. 6 denotes a state of the push region 213 of the window 210 while being pressed. As shown in FIG. 6, the first region 211 of the window 210 is fixed to the supporting surface 118, and the second region 212 is deflectable in an inward direction. Upon the push region 213 being pushed, the corresponding second region 212 (See FIG. 4) of the window 210 is deflected by a particular interval in the pushed direction. Accordingly, the first switch 221 is pressed by the corresponding push region 213 (See FIG. 7).

As such, the second region 212 of the window 210 is relatively movable with respect to the front case 101a, and accordingly, a hook member 240 for restricting upward movement the second region 212 is be provided at an end portion of the window 210. The hook member 240 restricts the upward movement of the window 210 by being stopped at one side of the front case 101a, particularly, at the second through hole 117b. The hook member 240 may be configured as a flange 240 attached onto a rear surface of the printed layer 217. Here, the flange 240 may be formed at a lower end of the window 210, and may be made of a metal (e.g., stainless steel). Alternatively, the flange 240 may be formed of the same material as the window 210 so as to be integrally formed with the window 210.

The flange 240 may include a fixed portion 241 attached and fixed onto the rear surface of the window 210, and a stop portion 242 extending from the fixed portion 241 and configured to be stopped at the rear surface of the front case 101a.

To assembly the window 210 with the front case 101a, the first region 211 of the window 210 is aligned in the supporting surface 118 in a state where the flange 240 is stopped at the front case 101a. The first region 211 of the window 210 is then attached onto the supporting surface 118 by use of an adhesive or adhesive film, so as to complete the assembly of the window 210.

Figure 7:
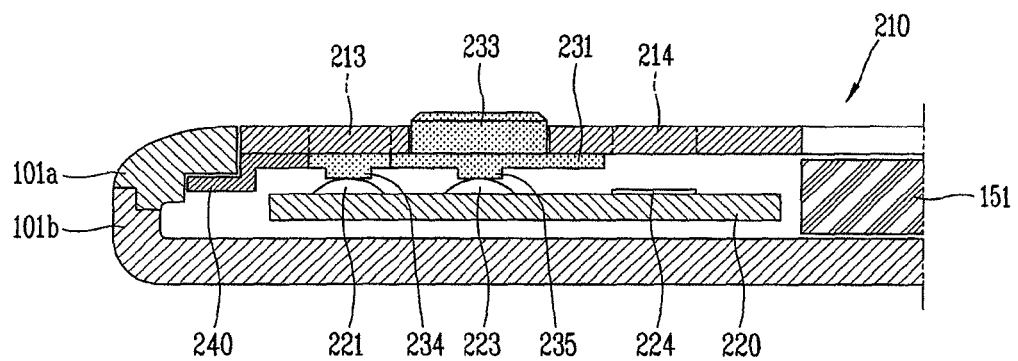
FIG. 7 shows a partial cross-sectional view of a mobile terminal in accordance with the exemplary embodiment of the present invention.

As shown in FIG. 7, and as described above, upon the push region 213 of the second region 212 being pushed, the window 210 is deflected by a particular interval in the pushed direction. Accordingly, the first push protrusion 234 formed at the rear surface of the key sheet 231 presses the first switch 221. The first switch 221 then operates to input information in cooperation with the pushing.

After inputting the information, the window 210 is returned to its original position by its own elasticity. In this case, the flange 240 is stopped at the front case 101a, thus restricting the upward movement of the second region 212 of the window 210.

When the second key button 233 is pressed, the corresponding second push protrusion 235 formed at the rear surface of the key sheet 231 presses the third switch 223. The third switch 223 then operates to input information in cooperation with the pushing. Such a configuration can be equally applied to the first key button 232 and the second switch 222.

Further, when a touch input is applied to the touch region 214, the corresponding touch sensor 224 detects the touch input, and sends the detected information to the controller 180.

As aforementioned, this present invention is configured to fix the first region of the window and allow the second region to be relatively movable, such that the window itself can be operated in a pressing manner, whereby information can be input. Hence, it is possible to obtain more simple appearance of the terminal and improve the sense of manipulation of the terminal.

Further, present invention provides a hook member in combination with the window to prevent the window from coming off by restricting the upward movement of the window.

Also, the present invention is configured to attach the supporting plate onto the rear surface of the window, thereby minimizing degradation of rigidity of the window that may be caused by a decreased thickness of the window.

The aforesaid configuration and method for the mobile terminal is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiment described herein may be combined in various ways to obtain additional and/or alternative exemplary embodiments.

As the present features may be embodied in several forms without departing from the characteristics thereof, it should also be understood that the above-described embodiment is not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal body having a front case;
a window coupled to the terminal body so as to cover a front surface of the terminal body, the window being divided into a first region and a second region, the second region extending from the first region;
a display module disposed under the first region, the display module being configured to display visible information through the first region;
at least one switch disposed under the second region, the at least one switch being configured to allow inputting of information when at least part of the second region is pressed inward;

a window-mounting portion at which the window is disposed, the window-mounting portion having a supporting surface, and the first region of the window being fixed to the supporting surface; and a hook member coupled to a portion of the second region, the hook member being configured to restrict upward movement of the second region with respect to the terminal body, wherein the window is formed of an elastically deflectable synthetic resin, the first region of the window is supported by a supporting plate located at a rear side of the first region, the supporting plate being formed of a transparent material for supplying rigidity to the first region, and wherein the hook member includes:
- a fixed portion attached to the rear surface of the window; and
- a stop portion extending from the fixed portion, the stop portion being configured to contact on a rear surface of the front case.

2. The mobile terminal of claim 1, wherein the window mounting portion includes:
- a first through hole defined by the supporting surface such that information output on the display module is viewable through the first through hole; and
- a second through hole corresponding to the second region, the at least one switch being disposed in the second through hole.

3. The mobile terminal of claim 2, further comprising a printed circuit board disposed in the second through hole, the at least one switch being mounted on the printed circuit board.

4. The mobile terminal of claim 1, wherein the hook member is formed of a metal.

5. The mobile terminal of claim 1, wherein the window is attached to the supporting surface by an adhesive.

6. The mobile terminal of claim 1, wherein the second region includes a plurality of key holes, each of the plurality of key holes having a pressable button disposed therein.

7. The mobile terminal of claim 6, wherein the second region includes at least two push regions, each push region being formed adjacent a corresponding one of the plurality of key holes, and
wherein the at least one switch includes at least two switches, each push region being configured to press a corresponding one of the two switches upon being pushed.

8. The mobile terminal of claim 7, wherein the push regions are located further from the first region than the plurality of key holes are located from the first region so as to increase the deflection of the push regions.

9. The mobile terminal of claim 7, wherein at least one of a symbol, a character, and a number representing key input information is indicated on each of the push regions.

10. The mobile terminal of claim 7, wherein the second region includes at least two touch regions, each touch region being located adjacent to a corresponding one of the plurality of key holes and located opposite a correspond one of the push regions, and
wherein a touch sensor mounted at a rear side of each of the touch regions, the touch sensors being configured to detect a touch input applied to a corresponding one of the touch regions.

11. The mobile terminal of claim 6, wherein the second region includes at least two touch regions, each touch region being located adjacent to a corresponding one of the plurality of key holes, and
wherein a touch sensor mounted at a rear side of each of the touch regions, the touch sensors being configured to detect a touch input applied to a corresponding one of the touch regions.

* * * * *